United States Patent Office
2,727,878
Patented Dec. 20, 1955

2,727,878
POLYBLENDS

Richard L. Baliman, Northampton, and John M. Chamberlin, Springfield, Mass., assignors to Monsanto Chemical Company, St. Louis, Mo., a corporation of Delaware No Drawing. Application September 9, 1952,
Serial No. 308,717

4 Claims. (Cl. 260—45.5)

This invention relates to polystyrene molding powders. More particularly the invention relates to polystyrene molding powders having increased impact strength coupled with increased flexural strength, tensile strength and elongation.

Polystyrene molding powders have been widely accepted in the plastics field due to their low cost, high tensile strength, excellent insulating properties and extreme clarity. One of the major defects of polystyrene is its brittleness which is most conveniently measured by its impact strength.

Various means have been used to increase the impact strength of polystyrene with considerable degree of success but generally accompanied by a substantial loss of tensile strength and flexural strength.

One object of this invention is to provide a new polystyrene molding powder.

A further object is to provide a polystyrene molding powder which can be molded into articles having increased impact strength.

Another object is to improve the impact and flexural strength of polystyrene molded objects without substantial lowering of tensile strength and elongation.

These and other objects are attained by blending a copolymer of butadiene and styrene with a homopolymer of styrene.

The following examples are given in illustration and are not intended as limitations on the scope of this invention. Where parts are mentioned they are parts by weight.

EXAMPLE I

Blend together in a rotary blender 98 parts of a homopolymer of styrene having a Staudinger molecular weight of about 60,000 with 2 parts of a copolymer of butadiene and styrene containing equal amounts by weight of each component and having a Mooney viscosity of about 80. To obtain a homogeneous blend, both the polymer and copolymer should be in particulate form and should have substantially the same average particle size and shape. The blended material may be injection molded directly, or it may be further worked on hot milling rolls or in heated extruders with dyes, fillers, pigments, etc. before the injection molding step.

Molded articles prepared by any of these methods have higher impact strength, greater tensile and flexural strength and improved elongation as compared to similar articles made from the same homopolymer of styrene without the addition of the copolymer.

EXAMPLE II

Mill 96 parts of a homopolymer of styrene having a molecular weight of about 55,000 (Staudinger) with 4 parts of a 50:50 butadiene-styrene copolymer having a Mooney viscosity of about 95 on hot milling rolls at a temperature of about 400° F. Cool and comminute to prepare a molding powder. Injection mold the molding powder at about 400° F. Articles molded therefrom have higher impact, flexural and tensile strength and greater elongation than unmodified polystyrene articles.

Since butadiene-styrene copolymers are generally prepared in aqueous emulsion, it is necessary to remove the water therefrom in order to obtain a dry powder for blending as shown in the preceding examples. Such drying is generally done by a drum drying process and meets with great difficulty due to the rubbery nature of the copolymer. To surmount this difficulty and arrive at an economically feasible process it has been found convenient to mix the butadiene-styrene copolymer latex with a styrene homopolymer latex and then dry the mixed latex. The homopolymer hardens the copolymer to such an extent that the combination handles easily and economically in the drum drying process. The dried mixture is then further blended with a homopolymer of styrene prepared by a mass polymerization process.

EXAMPLE III

Mix 80 parts of a 40% solids latex containing a homopolymer of styrene having a molecular weight of 70,000 with 20 parts of a 40% solids latex containing a 50:50 copolymer of butadiene and styrene having a Mooney viscosity of about 65. Remove the water from the mixed latices by drum drying. Prepare a series of molding powders by blending the drum dried powder with a particulate mass polymer of polystyrene to obtain blends containing 10, 20 and 50% by weight of the drum dried powder. After thoroughly blending each mixture in a rotary blender, injection mold 2½" x ½" x ⅛" test bars. Test the bars by standard ASTM tests D256–43T, D638–46T, and D790–45T for Izod notched impact strength, tensile strength, flexural strength and elongation. The results are shown in Table I.

Table I

| Sample | 1 | 2 | 3 | 4 |
|---|---|---|---|---|
| Styrene Homopolymer | 100 | 90 | 80 | 50 |
| Drum Dried Powder | 0 | 10 | 20 | 50 |
| Izod-Notched Impact Strength, Ft. lbs./in. of notch | 0.5 | 2.0 | 3.0 | 6.0 |
| Flexural Strength, lbs./in.$^2$ | 10,400 | 11,300 | 11,000 | 9,500 |
| Tensile Strength, lbs./in.$^2$ | 6,800 | 7,200 | 7,000 | 6,500 |
| Elongation, Percent | 1.3 | 1.6 | 1.8 | 2.5 |

It can be seen from Table I that each of the tested values is raised when compared with the unmodified styrene homopolymer when 10 and 20% of the molding powder is the drum dried blend. However, above 20% of blend, the flexural and tensile strengths begin to decrease so that at 50% blend the tensile and flexural strength is inferior to that of the pure homopolymer.

It has also been found that, contrary to the usual experience, small amounts of certain plasticizers actually increase the impact strength without materially decreasing the tensile and flexural strength of articles molded from blends of styrene homopolymer and butadiene-styrene copolymers.

EXAMPLE IV

Blend in a rotary blender, batches of 90, 80 and 50 parts of a homopolymer of styrene with 10, 20 and 50 parts, respectively, of a drum dried mixture of latices, said mixture containing 80% of a homopolymer of styrene having a molecular weight of 70,000 and 20% of a 50:50 copolymer of butadiene and styrene having a Mooney viscosity of about 85. To each blend, add 0.3 part of a mixture of aliphatic and aromatic hydrocarbons having a boiling point higher than 150° C. After the components are thoroughly mixed, injection mold 2½"x ½"x⅛" test bars from each of the blends and test the bars by the ASTM tests. The results are shown in Table II.

Table II

| Sample | 5 | 6 | 7 | 8 |
|---|---|---|---|---|
| Styrene Homopolymer | 100 | 90 | 80 | 50 |
| Drum Dried Powder | 0 | 10 | 20 | 50 |
| Izod-Notched Impact Strength, Ft. lbs./in. of notch | 0.5 | 2.2 | 3.4 | 6.5 |
| Flexural Strength, lbs./in.² | 10,400 | 11,200 | 10,800 | 9,500 |
| Tensile Strength, lbs./in.² | 6,800 | 7,000 | 6,800 | 6,200 |
| Elongation, percent | 1.3 | 1.8 | 2.0 | 2.6 |

Table II indicates the same general trend as shown in Table I except that the impact strength values and the elongation are even higher. Flexural and tensile strength increase to a maximum at about 20% of drum dried powder and then begin to decrease until at 50% of drum dried powder these values are lower than the values for the unmodified homopolymer.

Portions of each of the blends of Example IV show substantially the same strength and elongation values whether they are milled on hot milling rolls or malaxated in heated extruders and then comminuted into a molding powder followed by the injection molding step.

The copolymers of butadiene and styrene shown in the examples contained 50% by weight of butadiene. Other butadiene-styrene copolymers containing from 40 to 80% by weight of butadiene may be used. The amount of copolymer used is restricted to from 0.5 to 5 parts per 99.5 to 95 parts of styrene homopolymer. Improved flexural and tensile strength coupled with improved impact strength is substantial when 0.5 part of copolymer is used. These properties continue to improve to a maximum value at 2 parts of copolymer. As larger amounts of copolymer are added the flexural and tensile strength decreases while the impact strength continues to increase. At 5 parts of copolymer, the tensile and flexural strength approaches that of the styrene homopolymer. When more than 5 parts of copolymer are used there is a substantial and increasing loss in tensile and flexural strength.

The butadiene-styrene copolymers of this invention may be prepared by any of the conventional methods such as mass, solution, emulsion and suspension polymerization. They should have a Mooney viscosity of from 50 to 100, Mooney viscosity being the recognized viscosity measurement used in the rubber industry and being recognized by the American Society of Testing Materials as test number D927-49T. When the copolymers are blended with the dry styrene homopolymer, the copolymers should be free of solvent, water or other auxiliary polymerization aid. When the copolymers are blended as a latex with a styrene homopolymer latex, the blended latices should be substantially free from water before the final blending with dry styrene homopolymer.

Referring to the tables, the amount of combined butadiene-styrene copolymer in the drum dried powder is 20% of the total weight of the powder so that the amount of butadiene-styrene copolymer in the final blends is 0, 2, 4 and 10% respectively in samples 1, 2, 3 and 4 or 5, 6, 7 and 8.

The increase of tensile and flexural strength with the addition of plasticizers is an abnormal phenomenon. The general experience is that plasticizers increase impact strength and elongation but decrease tensile and flexural strength. The plasticizers which have been found to increase tensile and flexural strength are aliphatic and aromatic hydrocarbons and their chlorinated derivatives. The plasticizer may be a pure hydrocarbon or chlorinated hydrocarbon or a mixture thereof but the boiling point of the plasticizer must be above 150° C. The amount of plasticizer used should be no more than 1.0 part per 100 parts of polymer-copolymer blend. The plasticizer shown in Example IV was a mixture of aliphatic and aromatic hydrocarbons. Among the materials which may be used as plasticizers are normal aliphatic hydrocarbons containing at least 9 carbon atoms and such isomers and chlorine derivatives thereof as boil above 150° C. including nonane, decane, dodecane, hexadecane, eicosane, pentatriacontane, etc., and the mono and polychloro derivatives thereof; aromatic compounds such as chlorinated polyphenyls, polychlorinated benzenes, chlorinated naphthalenes, alkyl benzenes containing more than 2 carbon atoms in the alkyl group or groups, etc.; finally mixtures of 2 or more of these materials may be used providing only that the boiling point of the mixture is over 150° C.

The styrene homopolymer should have a molecular weight of from 40,000 to 90,000 as calculated by the Staudinger equation. It should be in particulate form for ready blending and should generally constitute at least 50% by weight of the final blend.

If a styrene homopolymer latex is used, the polymer should have a molecular weight of 40,000 to 90,000. In some instances it may constitute the major part or even all of the homopolymer used but the molded articles made therefrom are water-sensitive due to the emulsifying agent left in the polymer by the drying process. To obtain optimum properties in the molded articles the homopolymer derived from the latex should not constitute more than 50% of the final molding powder.

The compositions shown in the examples are pure polymer-copolymer blends which are used as molding powders to produce colorless crystal-clear objects. For other purposes the compositions may be further blended with conventional additives such as dyes, pigments, lubricants, fillers, etc.

It is obvious that variations may be made in the products and processes of this invention without departing from the spirit and scope thereof as defined by the appended claims.

What is claimed is:

1. A process for preparing a molding powder which comprises mixing an aqueous latex of a homopolymer of styrene having a Staudinger molecular weight of 40,000–90,000 with an aqueous latex of a copolymer of butadiene and styrene, drying the mixed latices, blending the dried mixture with a dry homopolymer of styrene having a Staudinger molecular weight of 40,000–90,000 in such proportion that the blend contains from 0.5 to 5 parts of copolymer for 99.5 to 95 parts of homopolymer, malaxating the blend at elevated temperatures and then comminuting the malaxated blend, said copolymer containing from 40 to 80% butadiene by weight and having a Mooney viscosity of 50–100.

2. A molding powder comprising a blend of from 99.5 to 95% by weight of a homopolymer of styrene having a Staudinger molecular weight of 40,000–90,000 with from 0.5 to 5% by weight of a copolymer of butadiene and styrene, said copolymer having a Mooney viscosity of 50 to 100 and containing from 40 to 80% butadiene and from 60 to 20% styrene, said blend having been prepared by mixing an aqueous latex of a homopolymer of styrene with an aqueous latex of a copolymer of butadiene and styrene, drying the mixed latices, and blending the dried mixture with a dry homopolymer of styrene.

3. A process for preparing a molding powder which comprise mixing a major portion of an aqueous latex of a homopolymer of styrene having a Staudinger molecular weight of 40,000–90,000 with a minor portion of an aqueous latex of a copolymer of butadiene and styrene, drying the mixed latices, blending the dried mixture with a dry homopolymer of styrene having a Staudinger molecular weight of 40,000–90,000 in such proportions that the blend contains from 0.5 to 5 parts of copolymer for 99.5 to 95 parts of homopolymer and that the homopolymer derived from said aqueous latex comprises less than 50% by weight of the total homopolymer content of the blend, malaxating the blend at elevated temperatures and then comminuting the malaxated blend, said copolymer having a Mooney viscosity of 50 to 100 and containing from 40 to 80% by weight of butadiene and from 60 to 20% by weight of styrene.

4. A process for preparing a molding powder which comprises mixing 80 parts by weight of a 40% solids aqueous latex of a homopolymer of styrene having a Staudinger molecular weight of 40,000–90,000 with 20 parts by weight of a 40% solids aqueous latex of a copolymer of butadiene and styrene, drying the mixed latices, blending 10 parts by weight of the dried mixture with 90 parts by weight of a dry homopolymer of styrene having a Staudinger molecular weight of 40,000–90,000 in order to form a blend containing 2 parts of copolymer and 98 parts of homopolymer, malaxating the blend at elevated temperatures and then comminuting the malaxated blend, said copolymer having a Mooney viscosity of about 80 and containing about 50% by weight of butadiene and 50% by weight of styrene.

References Cited in the file of this patent

UNITED STATES PATENTS

| | | |
|---|---|---|
| 2,578,518 | Ditz et al. | Dec. 11, 1951 |
| 2,616,864 | Donaldson | Nov. 4, 1952 |
| 2,623,863 | Dieckmann et al. | Dec. 30, 1952 |
| 2,646,418 | Lang | July 21, 1953 |

OTHER REFERENCES

Vanderbilt 1948 Rubber Handbook, 9th edition, published 1948 by R. T. Vanderbilt, New York, N. Y., pages 42–44.